(12) United States Patent
Bendix et al.

(10) Patent No.: US 7,034,074 B2
(45) Date of Patent: Apr. 25, 2006

(54) AQUEOUS PRIMARY DISPERSIONS AND COATING AGENTS, METHODS FOR PRODUCING THEM AND THEIR USE

(75) Inventors: Maximilian Bendix, Oelde (DE); Heinz-Peter Rink, Münster (DE); Elisabeth Wessling, Emsdetten (DE); Reinhold Clauss, Steinfurt (DE); Ralf Nicholaus, Drensteinfurth (DE)

(73) Assignee: BASF Coatings AG, Munster (DE)

( * ) Notice: Subject to any disclaimer, the term of this patent is extended or adjusted under 35 U.S.C. 154(b) by 167 days.

(21) Appl. No.: 10/239,938

(22) PCT Filed: Mar. 10, 2001

(86) PCT No.: PCT/EP01/02707

§ 371 (c)(1),
(2), (4) Date: Sep. 26, 2002

(87) PCT Pub. No.: WO01/79366

PCT Pub. Date: Oct. 25, 2001

(65) Prior Publication Data

US 2003/0143414 A1 Jul. 31, 2003

(30) Foreign Application Priority Data

Apr. 14, 2000 (DE) ................. 100 18 601

(51) Int. Cl.
*C08F 2/22* (2006.01)
*C08F 112/32* (2006.01)

(52) U.S. Cl. .................. 524/804; 526/346; 526/347; 528/45; 528/73; 528/367; 528/369; 528/423; 525/329.9

(58) Field of Classification Search .......... 526/279; 524/800; 525/329.9
See application file for complete search history.

(56) References Cited

U.S. PATENT DOCUMENTS

| | | | |
|---|---|---|---|
| 3,552,986 A | 1/1971 | Bassemir | 117/12 |
| 3,577,476 A | 5/1971 | Gurney | 260/62 |
| 4,085,168 A | 4/1978 | Milkovich et al. | 260/886 |
| 4,413,036 A | 11/1983 | Drexler et al. | 428/458 |
| 4,521,580 A | 6/1985 | Turner et al. | 526/307.2 |
| 4,533,701 A | 8/1985 | Kusumoto et al. | 525/370 |
| 4,636,545 A | 1/1987 | Konig et al. | |
| 4,656,226 A | 4/1987 | Hutchins et al. | 525/93 |
| 4,677,003 A | 6/1987 | Redlich et al. | 427/373 |
| 5,047,454 A | 9/1991 | Cowles et al. | 523/500 |
| 5,126,393 A | 6/1992 | Blum et al. | 524/538 |
| 5,185,396 A | 2/1993 | Biale | |
| 5,332,715 A | 7/1994 | Loher et al. | 427/409 |
| 5,385,996 A | 1/1995 | Rizzardo et al. | 526/240 |
| 5,395,903 A | 3/1995 | Charmot et al. | 526/220 |
| 5,516,559 A | 5/1996 | Rockrath et al. | 427/407.1 |
| 5,521,229 A | 5/1996 | Lu et al. | 522/40 |
| 5,565,508 A | 10/1996 | Hoenel et al. | 523/414 |
| 5,601,880 A | 2/1997 | Schwarte et al. | 427/407.1 |
| 5,670,557 A | 9/1997 | Dietz et al. | 522/184 |
| 5,773,543 A | 6/1998 | Rizzardo et al. | 526/215 |
| 5,830,927 A | 11/1998 | Vanderhoff et al. | 522/81 |
| 5,830,928 A | 11/1998 | Faler et al. | 523/502 |
| 5,840,372 A | 11/1998 | Rink et al. | 427/407 |
| 5,854,353 A | 12/1998 | Knoll et al. | 525/314 |
| 5,857,998 A | 1/1999 | Barry | 604/96 |
| 5,859,112 A | 1/1999 | Overbeek et al. | 524/460 |
| 5,905,132 A | 5/1999 | Wegner et al. | 528/45 |
| 5,959,026 A | 9/1999 | Abusleme et al. | 524/506 |
| 5,969,030 A | 10/1999 | Grandhee | 524/457 |
| 5,972,809 A | 10/1999 | Faler et al. | 442/103 |
| 5,990,221 A | 11/1999 | Dames et al. | 524/457 |
| 6,020,438 A | 2/2000 | Lubnin et al. | 525/317 |
| 6,100,350 A | 8/2000 | Wilczek et al. | 526/82 |
| 6,106,049 A | 8/2000 | Cole et al. | 524/804 |
| 6,140,386 A | 10/2000 | Vanderhoff et al. | 522/78 |
| 6,160,049 A | 12/2000 | Mathauer et al. | 524/804 |
| 6,162,886 A | 12/2000 | Bremer et al. | 526/318.42 |
| 6,221,949 B1 | 4/2001 | Gross et al. | 524/451 |
| 6,235,857 B1 | 5/2001 | Rizzardo et al. | 526/220 |
| 6,346,591 B1 | 2/2002 | Ohrbom et al. | 526/312 |
| 6,384,110 B1 | 5/2002 | Gooch et al. | |
| 6,403,709 B1 | 6/2002 | Ramesh et al. | 525/95 |
| 6,462,139 B1 * | 10/2002 | Das et al. | 525/329.9 |
| 6,503,983 B1 | 1/2003 | Morrison et al. | |
| 6,506,836 B1 | 1/2003 | Bremser et al. | 525/64 |
| 6,512,026 B1 | 1/2003 | Ott et al. | |
| 6,566,476 B1 | 5/2003 | Ohrbom et al. | 526/312 |

(Continued)

FOREIGN PATENT DOCUMENTS

CA 2004988 12/1989

(Continued)

OTHER PUBLICATIONS

Basf Coatings AG, US Appl. No. 10/018,703, filed Dec. 13, 2001, pp. 1-79.

(Continued)

*Primary Examiner*—Marc S Zimmer

(57) ABSTRACT

Aqueous primary dispersions and coating materials comprising dispersed and/or emulsified, solid and/or liquid polymer particles and/or dispersed solid core-shell particles having a diameter≦500 nm, preparable by free-radical microemulsion or miniemulsion polymerization of at least one olefinically unsaturated monomer (A) in the presence of at least one hydrophobic crosslinking agent for the (co) polymer resulting from the monomer or monomers (A), wherein said monomer or monomers (A) is or are dispersed prior to (co)polymerization in an aqueous dispersion of said crosslinking agent or agents; processes for preparing them, and their use.

12 Claims, No Drawings

U.S. PATENT DOCUMENTS

| | | | |
|---|---|---|---|
| 6,670,043 B1 | 12/2003 | Barkac et al. | |
| 2002/0035289 A1 | 3/2002 | Walter et al. | 560/157 |
| 2002/0086966 A1 | 7/2002 | Weise et al. | 526/312 |
| 2002/0103319 A1 | 8/2002 | Ohrbom et al. | 526/312 |
| 2002/0132921 A1 | 9/2002 | Ramesh et al. | 525/88 |
| 2003/0078337 A1 | 4/2003 | Bremser et al. | 524/502 |
| 2003/0086978 A1* | 5/2003 | Kim et al. | 424/501 |
| 2003/0091832 A1 | 5/2003 | Ohrbom et al. | 428/423.1 |

FOREIGN PATENT DOCUMENTS

| | | |
|---|---|---|
| CA | 2086156 | 12/1992 |
| CA | 2127919 | 7/1994 |
| CA | 2205030 | 11/1995 |
| CA | 2181934 | 7/1996 |
| CA | 2259559 | 7/1997 |
| CA | 2355620 | 12/1999 |
| CA | 2103595 | 8/2002 |
| DE | 3546594 | 12/1992 |
| EP | 358221 | 9/1989 |
| EP | 401565 | 12/1990 |
| EP | 498583 | 1/1992 |
| EP | 732359 | 3/1996 |
| EP | 755 946 | 7/1996 |
| WO | WO9106535 | 5/1991 |
| WO | WO92/13903 | 8/1992 |
| WO | WO9222355 | 12/1992 |
| WO | WO9322351 | 11/1993 |
| WO | WO96/15157 | 5/1996 |
| WO | WO9749739 | 12/1997 |
| WO | WO98/01478 | 1/1998 |
| WO | WO98/37104 | 8/1998 |
| WO | WO 98/37104 | 8/1998 |
| WO | WO 99/10413 | 3/1999 |
| WO | WO99/15597 | 4/1999 |
| WO | WO 200158963 A1 * | 8/2001 |
| WO | WO 02/064652 A1 | 8/2002 |
| WO | WO 02/064692 A1 | 8/2002 |

OTHER PUBLICATIONS

Derwent Accession No. 1999-502399, English Abstract for JP11217409, Aug. 10, 1999.

Derwent Accession No. 1996-094214, English Abstract for JP08003208, Jan. 8, 1996.

Derwent Accession No. 1986-152526, English Abstract for Nippon, JP61085417, May 01, 1986.

English Abstract for, Dalibor, DE 3546594, filed Dec. 10, 1987.

English Abstract for Grutter, EP 358 221, filed Mar. 14, 1990.

English Abstract for Knoll, et al., EP 732 359, filed Sep. 18, 1996.

Abstract of JP 07-316242, Derwent Assession No. 1996-05619, Dec. 05, 1995.

Translation of WO 02/064692, U.S. Appl. No. 10/250,694, filed on Jul. 3, 2003.

Translation of WO 02/064652, U.S. Appl. No. 10/250,586, filed on Jul. 2, 2003.

English Translation for BASF Corporation, et al., U.S. Appl. No. 10/049,607, filed Feb. 14, 2002.

English Translation for BASF Corporation, et al., U.S. Appl. No. 10/088,376, filed Mar. 11, 2002.

English Translation for BASF Corporation, et al., U.S. Appl. No. 10/049,656, filed Feb. 13, 2002.

English Translation for BASF Corporation, et al., U.S. Appl. No. 10/169,473, filed Jun. 28, 2002.

English Translation for BASF Corporation, et al., U.S. Appl. No. 10/148,427, filed May 29, 2002.

English Translation for BASF Corporation, et al., U.S. Appl. No. 09/263,426, filed Mar. 05, 1999.

English Translation for BASF Corporation, et al., U.S. Appl. No. 10/148,428, filed May 29, 2002.

English Translation for BASF Corporation, et al., U.S. Appl. No. 10/148,295, filed May 29, 2002.

English Translation for BASF Corporation, et al., U.S. Appl. No. 09/926,532, filed Nov. 16, 2001.

English Translation for BASF Corporation, et al., U.S. Appl. No. 09/856,951, filed May 29, 2001.

English Translation for BASF Corporation, et al., U.S. Appl. No. 09/830,694, filed Sep. 21, 1999.

* cited by examiner

AQUEOUS PRIMARY DISPERSIONS AND COATING AGENTS, METHODS FOR PRODUCING THEM AND THEIR USE

This application is a National Phase of Patent Application PCT/EP01/02707 filed 10 Mar. 2001.

The present invention relates to novel aqueous primary dispersions and coating materials which comprise dispersed and/or emulsified, solid and/or liquid polymer particles and/or dispersed solid core-shell particles having a diameter $\leq 500$ nm. The present invention further relates to a novel process for preparing the novel aqueous primary dispersions and coating materials by means of controlled free-radical microemulsion and miniemulsion polymerization. The present invention relates, furthermore, to the use of the novel aqueous primary dispersions and coating materials for producing single-coat or multicoat transparent finishes and single-coat or multicoat color and/or effect finishes in automotive OEM finishing and refinishing, industrial coating, including container coating, coil coating and the coating of electrical components, interior and exterior architectural coating, window and door coating and furniture coating.

Microemulsions and miniemulsions are dispersions comprising water, an oil phase and one or more surface-active substances and having-droplet sizes of from 5 to 50 nm (microemulsions) or from 50 to 500 nm. Microemulsions are regarded as being thermodynamically stable, whereas the miniemulsions are regarded as metastable (cf. Emulsion Polymerization and Emulsion Polymers, Editors: P. A. Lovell and Mohamed S. El-Aasser, John Wiley and Sons, Chichester, N.Y., Weinheim, 1997, pages 700 et seq.; Mohamed S. El-Aasser, Advances in Emulsion Polymerization and Latex Technology, $30^{th}$ Annual Short Course, Volume 3, June 7–11, 1999, Emulsion Polymers Institute, Lehigh University, Bethlehem, Pa., USA). Both types of dispersions find broad application in the art: for example, in cleaning products, cosmetics or bodycare products. They may, however, also be used for polymerization reactions in place of the customary macroemulsions, in which droplet sizes >1000 nm are present.

The preparation of aqueous primary dispersions by means of free-radical miniemulsion polymerization is known, for example, from the international Patent Application WO 98/02466 or from German Patents DE 196 28 143 A1 and DE 196 28 142 A1. In the case of these known processes, the monomers may be copolymerized in the presence of different low molecular mass, oligomeric or polymeric, hydrophobic substances, which are also referred to as costabilizers. Furthermore, hydrophobic, organic auxiliaries of low solubility in water, such as plasticizers, enhancers of the tackiness of the resulting film, film forming auxiliaries or other, unspecified organic additives, may be incorporated into the monomer droplets of the miniemulsion. The use of the known aqueous primary dispersions for preparing coating materials is not evident from the patents.

Aqueous coating materials based on aqueous primary dispersions which comprise solid core-shell particles and have been prepared by miniemulsion polymerization of monomers in the presence of hydrophobic polymers are known from the patent applications EP 0 401 565 A1, WO 97/49739 or EP 0 755 946 A1. Although the known coating materials already have numerous advantageous properties, problems associated with inadequate distribution of the crosslinking agents in the aqueous dispersions continue to arise. One particular consequence of this is the need to use a larger amount of crosslinking agents than would be necessary theoretically. Unreacted crosslinking agents may then, in certain circumstances, impair the performance properties of the coatings produced from the coating materials.

The microencapsulation of hydrophobic organic solvents or of target materials such as biocides and herbicides in water-insoluble core-shell particles, prepared by miniemulsion polymerization, is known from the patents EP 0 203 724 A1 or U.S. Pat. No. 4,677,003 A1. However, the (co) polymerization is not conducted in the presence of hydrophobic crosslinking agents for the (co)polymers formed from the monomers.

Patent Applications EP 0 622 389 A1 or DE 43 14 297 A1 disclose the (co)polymerization of monomers in the presence of blocked polyisocyanates and epoxy resins. The technique used, however, is not that of miniemulsion polymerization. A comparable process is evident from Patent Applications EP 0 758 347 A1 or WO 95/29944. The corresponding known (co)polymers and their primary dispersions are used to prepare coating materials. The known coating materials likewise possess the problems associated with inadequate fine distribution of the crosslinking agents in the coating materials.

Furthermore, free-radical addition polymerization employed to prepare acrylate copolymers is frequently very exothermic and difficult to, control. What this means for the reaction regime is that high concentrations of monomers and/or the so-called batch procedure, where the total amount of the monomers is introduced as initial charge in an aqueous medium, emulsified and subsequently polymerized to completion, must be avoided. In addition, the targeted establishment of defined molecular weights, molecular weight distributions and other properties often causes difficulty. The controlled establishment of a defined profile of properties in acrylate copolymers is, however, of great importance for their use as binders in coating materials, especially aqueous coating materials, since by this means it is possible to exert direct influence on the performance properties profile of the coating materials.

There has therefore been no lack of attempts to regulate the free-radical copolymerization of olefinically unsaturated monomers.

For instance, the international Patent Application WO 98/01478 describes a process in which the copolymerization is conducted in the presence of a free-radical initiator and of a thiocarbonylthio compound as chain transfer agent.

The international Patent Application WO 92/13903 describes a process for preparing copolymers of low molecular weight by free-radical chain polymerization in the presence of a group transfer agent having a carbon-sulfur double bond. These compounds act not only as chain transfer agents but also as growth regulators, and so result only in copolymers of low molecular weight.

The international Patent Application WO 96/15157 discloses a process for preparing copolymers having a comparatively narrow molecular weight distribution, in which a monomer is reacted with a vinyl-terminated macromonomer in the presence of a free-radical initiator.

Furthermore, the international Patent Application WO 98/37104 discloses the preparation of acrylate copolymers having defined molecular weights by free-radical polymerization in the presence of a chain transfer agent having a carbon-carbon double bond and having radicals which activate this double bond in respect of the free-radical addition of monomers.

Despite significant progress in this field, there continues to be a lack of a universally applicable process of controlled free-radical polymerization which yields chemically structured polymers, especially acrylate copolymers, in a simple manner and by means of which it is possible to tailor the profile of properties of the polymers in respect of their application in coating materials, especially aqueous coating materials, which are used to produce transparent finishes and multicoat color and/or effect finishes.

German Patent Application DE 199 59 928.9 by BASF Coatings AG, bearing the internal file reference PAT 99 174 DE, which was unpublished on the priority date of the present specification and bears the title "Aqueous primary dispersions and coating materials, process for preparing them and their use", describes aqueous primary dispersions and coating materials comprising dispersed and/or emulsified, solid and/or liquid polymer particles and/or dispersed, solid core-shell particles having a diameter≦500 nm and preparable by free-radical microemulsion or miniemulsion polymerization of at least one olefinically unsaturated monomer (A) in the presence of at least one hydrophobic crosslinking agent for the (co)polymer resulting from the monomer or monomers (A). In that case, however, the monomers (A) and the crosslinking agents, along with the other constituents of the miniemulsion or microemulsion, are dissolved in organic solvents and then emulsified in a mixture of water and emulsifier. German Patent Application DE 199 24 674.2 by BASF Coatings AG, bearing the internal file reference PAT 99 198 DE, which was unpublished on the priority date of the present specification and bears the title "Aqueous primary dispersions and coating materials, process for preparing them and their use", likewise describes aqueous primary dispersions and coating materials comprising dispersed and/or emulsified, solid and/or liquid polymer particles and/or dispersed, solid core-shell particles having a diameter≦500 nm and preparable by free-radical microemulsion or miniemulsion polymerization of an olefinically unsaturated monomer (A) and a diarylethylene (B) in the presence of at least one hydrophobic crosslinking agent for the copolymer resulting from the monomers (A). Here again, the monomers (A) and the crosslinking agents, along with the other constituents of the miniemulsion or microemulsion, are dissolved in organic solvents and then emulsified in a mixture of water and emulsifier.

It is an object of the present invention to find new aqueous primary dispersions and coating materials comprising dispersed and/or emulsified, solid and/or liquid polymer particles and/or dispersed solid core-shell particles having a diameter≦500 nm which no longer have the disadvantages of the prior art but instead can be prepared in a simple manner with a minimum of emulsifiers and/or strongly hydrophobic compounds. Furthermore, the new aqueous primary dispersions and coating materials ought to comprise very finely divided crosslinking agents. The copolymers present in the new aqueous primary dispersions and coating materials ought to have defined molecular weights and ought to be preparable inter alia, if required, by the batch procedure without the occurrence in this case of the problems associated with the highly exothermic nature of the free-radical polymerization, ranging for instance from the thermal damaging of the products through to runaway of the reactor.

A further object of the present invention was to find a new process for preparing aqueous primary dispersions and coating materials by free-radical microemulsion or miniemulsion polymerization which no longer has the disadvantages of the prior art.

Accordingly, we have found the novel aqueous primary dispersions and coating materials comprising dispersed and/or emulsified, solid and/or liquid polymer particles and/or dispersed solid core-shell particles having a diameter≦500 nm preparable by free-radical microemulsion or miniemulsion polymerization of at least one olefinically unsaturated monomer (A) in the presence of at least one hydrophobic crosslinking agent for the (co)polymer resulting from the monomer or monomers (A), the monomer or monomers (A) being dispersed prior to (co)polymerization in an aqueous dispersion of the crosslinking agent or agents, which are referred to below for short as "primary dispersions of the invention", and, respectively, "coating materials of the invention".

We have also found the novel process for preparing aqueous primary dispersions and coating materials comprising dispersed and/or emulsified, solid and/or liquid polymer particles and/or dispersed solid core-shell particles having a diameter≦500 nm which comprises subjecting at least one olefinically unsaturated monomer (A) to free-radical (co)polymerization in a microemulsion or miniemulsion in the presence of at least one hydrophobic crosslinking agent for the (co)polymer resulting from the monomer or monomers (A), the monomer or monomers (A) being dispersed prior to (co)polymerization in an aqueous dispersion of the crosslinking agent or agents, said process being referred to for short below as "process of the invention".

Further subjects of the invention will emerge from the following description.

In the light of the prior art it was surprising and unforeseeable by the skilled worker that the object on which the present invention was based could be achieved through the primary dispersions of the invention and the coating materials of the invention and also through the process of the invention. In particular it was surprising that the (co)polymers present in the primary dispersions of the invention have properties which make them highly suitable for use in coating materials. It was also surprising that the primary dispersions of the invention can be used directly as coating materials, requiring even less crosslinking agent than conventional coating materials. Not least was it surprising that the process of the invention yields, as intended, the primary dispersions and coating materials of the invention in a particularly simple manner without the occurrence of the above-described problems known from the prior art. Last but not least, it was surprising that the primary dispersions of the invention can also be used with advantage as adhesives and sealing compounds or for their preparation.

For the purposes of the present invention, the property of being hydrophilic is understood as the constitutional property of a molecule or functional group to penetrate into the aqueous phase or to remain therein. Accordingly, for the purposes of the present invention, the property of being hydrophobic is understood as the constitutional property of a molecule or functional group to exhibit exophilic behavior with respect to water; i.e., they display the tendency not to penetrate into water, or to depart the aqueous phase. For further details reference is made to Römpp Lexikon Lacke und Druckfarben, Georg Thieme Verlag, Stuttgart, N.Y., 1998, "Hydrophilicity", "Hydrophobicity", pages 294 and 295.

In accordance with the invention, the primary dispersions and coating materials comprise dispersed and/or emulsified solid and/or liquid polymer particles and/or dispersed core-shell particles. The size of the polymer particles or of the dispersed core-shell particles is a direct result of the process of the invention described below. In this case the average particle diameter is less than 500 nm. It is preferably from 10 to 500 nm, more preferably from 50 to 400 nm, and with very particular preference from 100 to 350 nm. The primary dispersions and coating materials of the invention have an advantageously high solids content of, for example, more than 20% by weight, preferably more than 30% by weight. It is even possible to obtain solids contents of more than 40% by weight. The primary dispersions and coating materials of the invention have a low viscosity even at high solids content.

The core-shell particles for use in accordance with the invention result from the graft copolymerization of organic solids and the monomers (A) for use in accordance with the invention, described below. Said organic solids are preferably hydrophobic polymers, as described, for example, in the patents EP 0 401 565 A1, page 3, line 5 to page 4, line 50, WO 97/49739, page 4, line 19 to page 5, line 3, or EP 0 55 946 A1, page 3, line 26 to page 5, line 38. These hydrophobic polymers may also be prepared by the process of the invention.

The primary dispersions and coating materials of the invention may also have a bimodal particle size distribution in which from 0.1 to 80% by weight, in particular from 1.0 to 50% by weight, of the (co)polymer resulting from the monomer or monomers (A) have a particle size, determined using an analytical ultracentrifuge, of from 20 to 500 nm, in particular from 50 to 300 nm, and from 20 to 99.9% by weight, in particular from 50 to 99% by weight, of the (co)polymer have a particle size of from 200 to 1500 nm, in particular from 300 to 900 nm, said particle sizes differing by at least 50 nm, in particular by at least 100 nm, with very particular preference by at least 200 nm. Concerning the measurement method, reference is made for further details to lines 5 to 9 of page 6 of German Patent Application DE 196 28 142 A1.

The first starting compound essential to the invention for the primary dispersions or coating materials of the invention, and for the process of the invention, is at least one olefinically unsaturated monomer (A).

In this context it is preferred to use at least one monomer (A) comprising reactive functional groups which are able to enter into crosslinking reactions with the complementary reactive functional groups of the crosslinking agents. Examples of suitable complementary reactive functional groups for use in accordance with the invention are collated in the overview below. In the overview, the variable R is an acyclic or cyclic aliphatic radical, an aromatic radical and/or an aromatic-aliphatic (araliphatic) radical; the variables R' and R" are identical or different aliphatic radicals or are linked to one another to form an aliphatic or heteroaliphatic ring.

Overview: Examples of Complementary Functional Groups

| Monomer (A) and crosslinking agent (C) or Crosslinking agent (C) and monomer (A) | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR |
| —O—(CO)—NH$_2$ | —CH$_2$—OH |
|  | —CH$_2$—O—R |
| 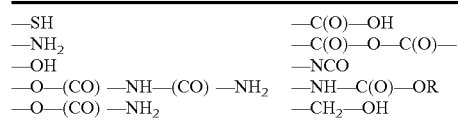 |  |
|  | —NH—CH$_2$—O—R |
|  | —NH—CH$_2$—OH |

| Monomer (A) and crosslinking agent (C) or Crosslinking agent (C) and monomer (A) | |
|---|---|
|  | —N(—CH$_2$—O—R)$_2$ |
|  | —NH—C(O)—CH(—C(O)OR)$_2$ |
|  | —NH—C(O)—CH(—C(O)OR)-(—C(O)—R) |
|  | —NH—C(O)—NR'R" |
|  | 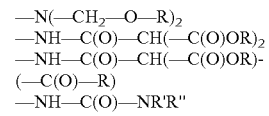 |
|  | 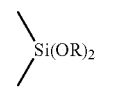 |
|  | 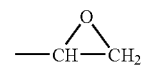 |
| —C(O)—OH | 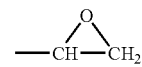 |
|  | —C(O)—N(CH$_2$—CH$_2$—OH)$_2$ |

The selection of the respective complementary groups is guided on the one hand by the consideration that, during the storage of primary dispersions or coating materials of the invention, these groups do not enter into any unwanted reaction and/or, if appropriate, do not inhibit or disrupt curing with actinic radiation, and on the other hand by the temperature range within which crosslinking is to take place.

In the case of the coating materials of the invention, it is preferred to use crosslinking temperatures of from 100 to 180° C. For this reason it is preferred to use monomers (A) having thio, hydroxyl, alkoxymethylamino, imino, carbamate, allophanate and/or carboxyl groups, in particular amino, alkoxymethylamino or hydroxyl groups, especially hydroxyl groups, on the one hand, and crosslinking agents containing anhydride, carboxyl, epoxy, blocked isocyanate, urethane, methylol, methylol ether, siloxane, carbonate, amino, hydroxyl and/or beta-hydroxyalkylamide groups, but especially blocked isocyanate, urethane or methylol ether groups, on the other.

Examples of suitable monomers (A) are a1) essentially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol acrylate or tert-butylcyclohexyl (meth)acrylate; (meth)acrylic oxaalkyl esters or oxacycloalkyl esters such as ethyltriglycol (meth)acrylate and methoxy-oligoglycol (meth)acrylate having a molecular weight Mn of preferably 550, or other ethoxylated and/or propoxylated hydroxyl-free (meth)acrylic acid derivatives. These may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indene-dimethanol or 1,2-, 1,3- or 1,4-cyclohexanediol; trimethylolpropane di- or tri(meth)acrylate; or pentaerythritol di-, tri- or tetra(meth)acrylate. For the purposes of the present invention, minor amounts of monomers of higher functionality in this case are to be understood as amounts which do not lead to crosslinking or gelling of the copolymers (A) unless the specific intention is to prepare crosslinked polymeric microparticles.

a2) Monomers which carry per molecule at least one hydroxyl, thio, amino, alkoxymethylamino, carbamate, allophanate or imino group, in particular a hydroxyl, amino or alkoxymethylamino group, and are essentially free from acid groups, such as hydroxyalkyl esters of acrylic acid, methacrylic acid or another alpha,beta-olefinically unsaturated carboxylic acid, which derive from an alkylene glycol esterified with the acid, or which are obtainable by reacting the alpha,beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monocrylate, monomethacrylate, monoethacrylate, monocrotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as trimethylolpropane monoallyl or diallyl ether or pentaerythritol monoallyl, diallyl or triallyl ether (as far as these monomers (a2) of higher functionality are concerned, the comments made above relating to the monomers (a1) of higher functionality apply analogously); N,N-dimethyl-aminoethyl acrylate, N,N-diethylaminoethyl methacrylate, allylamine or N-methyliminoethyl acrylate or N,N-di(methoxymethyl)aminoethyl acrylate and methacrylate or N,N-di(butoxymethyl)aminopropyl acrylate and methacrylate;

a3) monomers which carry per molecule at least one acid group which can be converted to the corresponding acid anion group, such as acrylic acid, methacrylic acid, ethacrylic acid, crotonic acid, maleic acid, fumaric acid or itaconic acid; olefinically unsaturated sulfonic or phosphonic acids or their partial esters; or mono(meth)acryloyloxyethyl maleate, succinate or phthalate. For the purposes of the present invention the monomers (a3) are not used as the sole monomers (A) but are always used in conjunction with other monomers (A) and, moreover, in amounts so small that the monomers (a3) do not polymerize outside the droplets of the miniemulsion.

a4) Vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (a4) may be prepared in conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, especially Versatic® acids.

a5) Reaction products of acrylic acid and/or methacrylic acid with the glycidyl ester of an alpha-branched monocarboxylic acid having 5 to 18 carbon atoms per molecule, in particular a Versatic® acid, or, instead of the reaction product, an equivalent amount of acrylic and/or methacrylic acid which is then reacted during or after the polymerization reaction with the glycidyl ester of an alpha-branched monocarboxylic acid having 5 to 18 carbon atoms per molecule, especially a Versatic® acid.

a6) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclopentadiene.

a7) (Meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclohexylmethyl- and/or N-methylol-, N,N-dimethylol-, N-methoxymethyl-, N,N-di(methoxymethyl)-, N-ethoxymethyl- and/or N,N-di(ethoxyethyl)-(meth)acrylamide;

a8) monomers containing epoxide groups, such as the glycidyl ester of acrylic acid, methacrylic acid, ethacrylic acid, crotonic acid, maleic acid, fumaric acid and/or itaconic acid.

a9) Vinylaromatic hydrocarbons such as styrene, alpha-alkylstyrenes, especially alpha-methylstyrene, and/or vinyltoluene; vinylbenzoic acid (all isomers), N,N-diethylaminostyrene (all isomers), alpha-methylvinylbenzoic acid (all isomers), N,N-diethylamino-alpha-methylstyrene (all isomers) and/or p-vinylbenzenesulfonic acid.

a10) Diarylethylenes, especially those of the general formula I:

$$R^1R^2C{=}CR^3R^4 \qquad (I)$$

in which the radicals $R^1$, $R^2$, $R^3$ and $R^4$ independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane or propane-1,3-diylcyclohexane. Examples of suitable cycloalkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl, and especially phenyl. Examples of suitable alkylaryl radicals are benzyl or ethylene- or propane-1,3-diylbenzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^1$, $R^2$, $R^3$ and/or $R^4$ are preferably phenyl or naphthyl radicals, especially phenyl radicals. The substituents present if appropriate in the radicals $R^1$, $R^2$, $R^3$ and/or $R^4$ are electron-withdrawing or electron-donating atoms or organic radicals, especially halogen atoms, nitrile radicals, nitro radicals, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; arylthio, alkylthio and cycloalkylthio radicals and/or primary, secondary and/or tertiary amino groups. Particularly advantageous are diphenylethylene, dinaphthaleneethylene, cis- or trans-stilbene, vinylidenebis(4-N,N-dimethylaminobenzene), vinylidenebis(4-aminobenzene) or vinylidenebis(4-nitrobenzene), especially diphenylethylene (DPE), and for this reason they are used with preference. For the purposes of the present invention, the monomers (a10) are not used as the sole monomers but are always used in conjunction with other monomers (A), and regulate the copolymerization in an advantageous manner such that free-radical copolymerization in batch mode is also possible.

a11) Nitriles such as acrylonitrile and/or methacrylonitrile.

a12) Vinyl compounds, especially vinyl halides and/or vinylidene dihalides such as vinyl chloride, vinyl fluoride, vinylidene dichloride or vinylidene difluoride; N-vinylamides such as vinyl-N-methylformamide, N-vinylcaprolactam, 1-vinylimidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

a13) Allyl compounds, especially allyl ethers and allyl esters such as allyl methyl, ethyl, propyl or butyl ether or allyl acetate, propionate or butyrate.

a14) Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000 and, in particular, from 3000 to 7000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international Patent Application WO 92/22615 on page 12, line 18 to page 18, line 10.

a15) Acryloxysilane-containing vinyl monomers, preparable by reacting hydroxy-functional silanes with epichlorohydrin and then reacting the reaction product with (meth)acrylic acid and/or hydroxyalkyl and/or hydroxycycloalkyl esters of (meth)acrylic acid (cf. monomers a2).

Further examples of suitable monomers (A) are disclosed in German Patent Application DE 196 28 142 A1, line 2, line 50 to page 3, line 7.

Each of the abovementioned monomers (A), with the exception of the monomers (a3) and (a10), can be polymerized alone to give polymers. In accordance with the invention, however, it is advantageous to use at least two monomers (A), since by this means it is possible to vary the profile of properties of the resulting copolymers very widely, in a particularly advantageous manner, and to tailor said profile of properties to the particular intended use of the primary dispersions of the invention or of the coating materials of the invention.

Preferably, the monomers (A) are selected so as to give (meth)acrylate (co)polymers whose profile of properties is determined primarily by the (meth)acrylates described above. In that case it is preferred as comonomers (A) to use vinylaromatic hydrocarbons (a9), especially styrene.

Particular advantages result in this case from the concomitant use of at least one monomer (a10), by means of which it is possible to regulate the copolymerization such that a batch procedure is possible and such as to result in comparatively low molecular mass products which are particularly suitable for use in coating materials.

The monomers (A) to be used in accordance with the invention are reacted with one another to form (co)polymers in the presence of at least one water-soluble and/or oil-soluble initiator which forms free radicals. Examples of initiators which can be used are: dialkyl peroxides, such as di-tert-butyl peroxide or dicumyl peroxide; hydroperoxides, such as cumene hydroperoxide or tert-butyl hydroperoxide; per esters, such as tert-butyl perbenzoate, tert-butyl perpivalate, tert-butyl per-3,5,5-trimethyihexanoate or tert-butyl per-2-ethylhexanoate; peroxodicarbonates; potassium, sodium or ammonium peroxodisulfate; azo initiators, examples being azodinitriles such as azobisisobutyro-nitrile; C-C-cleaving initiators such as benzpinacol silyl ether; or a combination of a nonoxidizing initiator with hydrogen peroxide. Combinations of the initiators described above may also be used.

Further examples of suitable initiators are described in German Patent Application DE-A-196 28 142, page 3, line 49 to page 4, line 6.

It is preferred to add comparatively large amounts of free-radical initiators, the proportion of the initiator in the reaction mixture being, based in each case on the overall amount of the monomers (A) and of the initiator, with particular preference from 0.2 to 20% by weight, with very particular preference from 0.5 to 15% by weight, and in particular from 1.0 to 10% by weight.

In accordance with the invention, the monomers (A) are copolymerized in the presence of at least one hydrophobic crosslinking agent. The hydrophobic crosslinking agents preferably contain the above-described reactive functional groups which enter into crosslinking reactions with the complementary reactive functional groups present in the resulting (co)polymers.

Examples of particularly suitable crosslinking agents are blocked polyisocyanates, tris(alkoxycarbonylamino)triazines or fully etherified amino resins.

Examples of suitable blocking agents for preparing the blocked polyisocyanates are blocking agents known from U.S. Pat. No. 4,444,954:

i) phenols such as phenol, cresol, xylenol, nitrophenol, chlorophenol, ethylphenol, t-butyl-phenol, hydroxybenzoic acid, esters of these acids, or 2,5-di-tert-butyl-4-hydroxytoluene;
ii) lactams, such as ε-caprolactam, δ-valerolactam, γ-butyrolactam or β-propiolactam;
iii) active methylenic compounds, such as diethyl malonate, dimethyl malonate, ethyl or methyl acetoacetate, or acetylacetone;
iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;
v) mercaptans such as butyl mercaptan, hexyl mercaptan, t-butyl mercaptan, t-dodecylmercaptan, 2-mercaptobenzothiazole, thiophenol, methylthiophenol or ethylthiophenol;
vi) acid amides such as acetoanilide, acetoanisidine amide, acrylamide, methacrylamide, acetamide, stearamide or benzamide;
vii) imides such as succinimide, phthalimide or maleimide;
viii) amines such as diphenylamine, phenylnaphthylamine, xylidine, N-phenylxylidine, carbazole, aniline, naphthylamine, butylamine, dibutylamine or butylphenylamine;
ix) imidazoles such as imidazole or 2-ethylimidazole;
x) ureas such as urea, thiourea, ethyleneurea, ethylenethiourea or 1,3-diphenylurea;
xi) carbamates such as phenyl N-phenylcarbamate or 2-oxazolidone;
xii) imines such as ethyleneimine;
xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;
xiv) salts of sulfurous acid such as sodium bisulfite or potassium bisulfite;
xv) hydroxamic esters such as benzyl methacrylohydroxamate (BMH) or allyl methacrylohydroxamate; or
xvi) substituted pyrazoles, especially dimethylpyrazole, or triazoles; and also
xvii) mixtures of these blocking agents, especially dimethylpyrazole and triazoles, malonic esters and acetoacetic esters or dimethylpyrazole and succinimide.

Examples of suitable organic polyisocyanates for blocking are in particular the so-called paint polyisocyanates having isocyanate groups attached to aliphatic, cycloaliphatic, araliphatic and/or aromatic structures. Preference is given to polyisocyanates having from 2 to 5 isocyanate groups per molecule and having viscosities of from 100 to 10,000, preferably from 100 to 5000.

Further examples of suitable polyisocyanates for blocking are described in "Methoden der organischen Chemie", Houben-Weyl, Volume 14/2, 4$^{th}$ edition, Georg Thieme Verlag, Stuttgart 1963, pages 61 to 70, and by W. Siefken, Liebigs Annalen der Chemie, Volume 562, pages 75 to 136. Suitable examples are the polyurethane prepolymers which contain isocyanate groups, can be prepared by reacting polyols with an excess of polyisocyanates and are preferably of low viscosity.

Further examples of suitable polyisocyanates for blocking are polyisocyanates containing isocyanurate, biuret, allophanate, iminooxadiazinedione, urethane, urea and/or uretdione groups. Polyisocyanates containing urethane groups, for example, are prepared by reacting some of the isocyanate groups with polyols, such as trimethylolpropane and glycerol, for example. Preference is given to the use of aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate, dicyclohexylmethane 4,4'-diisocyanate, diisocyanates derived from dimeric fatty acids, as marketed under the commercial designation DDI 1410 by Henkel and described in patents WO 97/49745 and WO 97/49747, especially 2-heptyl-3,4-bis(9-isocyanatononyl)-1-pentylcyclohexane; or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these polyisocyanates.

Very particular preference is given to the use of mixtures of polyisocyanates containing uretdione and/or isocyanurate groups and/or allophanate groups, which are based on hexamethylene diisocyanate, as formed by catalytic oligomerization of hexamethylene diisocyanate using appropriate catalysts. In particular, use is made of the 3,5-dimethylpyrazole-blocked isocyanurate of hexamethylene diisocyanate.

Examples of particularly suitable amino resins are melamine resins, guanamine resins or urea resins. In this context it is possible to use any amino resin that is suitable for clearcoats, or a mixture of such amino resins. For further details reference is made to Römpp Lexikon Lacke und Druckfarben, Georg Thieme Verlag, 1998, page 29, "Amino resins", and the textbook "Lackadditive" by Johan Bieleman, Wiley-VCH, Weinheim, N.Y., 1998, pages 242 ff., or to the book "Paints, Coatings and Solvents", second completely revised edition, editors: D. Stoye and W. Freitag, Wiley-VCH, Weinheim, N.Y., 1998, pages 80 ff. Also suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 A1 and EP 245 700 B1 and also in the article by B. Singh and coworkers "Carbamylmethylated Melamines, Novel Crosslinkers for the Coatings Industry" in Advanced Organic Coatings Science and Technology Series, 1991, Volume 13, pages 193 to 207.

The particularly suitable tris(alkoxycarbonylamino)triazines have the following formula:

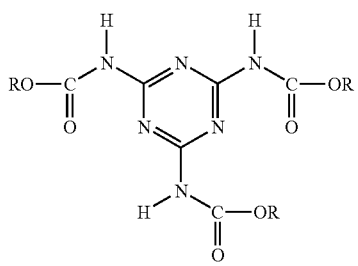

Examples of particularly suitable tris(alkoxycarbonylamino)triazines are described in the patents U.S. Pat. No. 4,939,213 A1, U.S. Pat. No. 5,084,541 A1 or EP 0 624 577 A1. Use is made in particular of the tris(methoxy-, tris(butoxy- and/or tris(2-ethylhexoxycarbonylamino)triazines (R=methyl, butyl or ethylhexyl).

The methyl butyl mixed esters, the butyl 2-ethylhexyl mixed esters and the butyl esters are of advantage. They have the advantage over the simple methyl ester of better solubility in polymer melts and also have a lower tendency to crystallize out.

Of the crosslinking agents described above, the blocked polyisocyanates offer particular advantages and are therefore used with very particular preference in accordance with the invention.

In the process of the invention, the ratio of the monomers (A) comprising complementary reactive functional groups to the crosslinking agents may vary very widely. In accordance with the invention it is of advantage if the molar ratio of complementary reactive functional groups in (A) to complementary reactive functional groups in the crosslinking agents is from 5.0:1.0 to 1.0:5.0, preferably from 4.0:1.0 to 1.0:4.0, with particular preference from 3.0:1.0 to 1.0:3.0, and in particular from 2.0:1 to 1:2.0. Particular advantages result if the molar ratio is approximately or precisely 1.0:1.0.

For the primary dispersions and coating compositions of the invention, and for the process of the invention, it is essential that the monomer or monomers (A) is or are added, before (co)polymerization, to an aqueous dispersion of at least one of the crosslinking agents described above.

The aqueous dispersion may contain the total amount of the crosslinking agents used in each case—for example, the total amount of the crosslinking agents used in a given coating material of the invention—or only part thereof—for example, up to 50, preferably 60, more preferably 70, with particular preference 80, with very particular preference 90, and especially 95, mol %. In accordance with the invention it is of advantage if the total amount of the crosslinking agents is present in the aqueous dispersion.

The crosslinking agent content of the aqueous dispersion may vary widely and depends primarily on the dispersibility of the particular crosslinking agents used. The crosslinking agent content is preferably from 10 to 80, more preferably from 15 to 70, with particular preference from 20 to 65, with very particular preference from 25 to 60, and especially from 30 to 55, % by weight, based in each case on the dispersion.

The continuous phase of the dispersion comprises essentially water. In addition to the crosslinking agents detailed above, the aqueous medium may also already comprise a portion of the above-described free-radical initiators and/or of the emulsifiers, protective colloids, hydrophobic compounds and/or customary and known additives, described below, and also any other dissolved or dispersed, solid, liquid or gaseous, organic and/or inorganic, low and/or high molecular mass substances, provided the latter do not adversely affect or even inhibit the (co)polymerization. For the purposes of the present invention, the term "minor amount" means an amount which does not remove the aqueous character of the aqueous medium.

Alternatively, the aqueous medium may comprise pure or virtually pure water, which is of advantage in accordance with the invention. In this case, the substances listed above, including if appropriate at least one additional crosslinking agent, are added simultaneously with, or following, the addition of the monomers (A) to the aqueous dispersion of the crosslinking agents. For the purposes of the present invention, "virtually pure water" is understood as water containing a minor amount, as defined above, of at least one water-miscible organic cosolvent such as N-methylpyrrolidone.

The amount of the monomers (A) dispersed in the aqueous dispersion of the crosslinking agents depends primarily on the above-described molar ratio of complementary reactive functional groups in the monomers (A) to complementary reactive functional groups in the crosslinking agents. The skilled worker will therefore be able readily to calculate the amount of monomers (A) used preferably in a given case.

In the procedure of the invention, the resulting preemulsion of the monomers (A) in the aqueous dispersion of the crosslinking agents is converted to a microemulsion or miniemulsion, in particular a miniemulsion. In this case the average particle diameter of the emulsified monomer droplets is below 500 nm. It is preferably from 10 to 500 nm, more preferably from 50 to 400 nm, and with very particular preference from 100 to 300 nm. The said particle diameter is the so-called z-average particle diameter, which is determined by means of photon correlation spectroscopy in accordance with the principle of dynamic, quasielastic light scattering. For this purpose use may be made, for example, of a Coulter N4 Plus Particle Analyzer from Coulter Scientific Instruments or a PCS Malvern Zetasizer 1000. The measurement is normally made on an aqueous emulsion containing 0.01% by weight of the emulsified monomer droplets. The aqueous emulsion further comprises, in the aqueous phase, the corresponding monomers in dissolved form (up to the saturation), so that the emulsified monomer droplets do not break up.

The preparation of the miniemulsion as part of the process of the invention has no particular features as to method, but instead takes place in accordance with the customary and known methods of dispersing or emulsifying in a high shear field. Examples of suitable methods are described in the patents DE-A-196 28 142, page 5, lines 1 to 30, DE-A-196 28 143, page 7, lines 30 to 58, or EP-A-0 401 565, page 5, lines 27 to 51.

The monomers (A) can be copolymerized in the presence of emulsifiers and/or protective colloids. Examples of suitable emulsifiers and/or protective colloids, and the amounts in which they are advantageously used, are disclosed in German Patent Application DE-A-196 28 142, page 3, lines 8 to 48. It is a particular advantage of the process of the invention that comparatively small amounts of emulsifiers and/or protective colloids need be used.

In addition to the hydrophobic crosslinking agents described above for use in accordance with the invention, the (co)polymerization of the monomers (A) to be used in accordance with the invention may also be accompanied by hydrophobic compounds which differ materially from the crosslinking agents. These hydrophobic compounds are also referred to by those in the art as costabilizers.

The hydrophobic compounds comprise water-insoluble substances which are polymers, oligomers or of low molecular mass. Examples of suitable hydrophobic compounds are esters of alpha,beta-monoolefinically unsaturated carboxylic acids, having 3 to 6 carbon atoms, with alcohols having 12 to 30 carbon atoms in the alkyl radical; esters of vinyl alcohol and/or allyl alcohol with alkanemonocarboxylic, -sulfonic and/or -phosphonic acids having 12 to 30 carbon atoms in the molecule; amides of alpha,beta-monoolefinically unsaturated carboxylic acids having 3 to 6 carbon atoms with alkylamines having 12 to 30 carbon atoms in the alkyl radical; macromonomers based on olefinically unsaturated compounds having on average at least one olefinically unsaturated group, in particular at least one terminal olefinically unsaturated group, in the molecule; polysiloxane macromonomers having on average at least one olefinically unsaturated group, in particular at least one terminal olefinically unsaturated group, in the molecule; oligomeric and/or polymeric products of addition polymerization, polycondensation and/or polyaddition; water-insoluble molecular weight regulators, especially mercaptans; aliphatic, cycloaliphatic and/or aromatic halogenated and/or nonhalogenated hydrocarbons; alkanols and/or alkylamines having at least 12 carbon atoms in the alkyl radical; organosilanes and/or organosiloxanes; vegetable, animal, semisynthetic and/or synthetic oils; hydrophobic dyes. Further examples of suitable hydrophobic compounds, or costabilizers, and the amounts in which they are advantageously used, are disclosed in German Patent Application DE-A-196 28 142, page 4, lines 37 to 59. It is a further particular advantage of the process of the invention that in many cases it is possible to do without the use of hydrophobic compounds.

In terms of molecular weight and the molecular weight distribution, the (co)polymers formed from the monomers (A) are not subject to any restrictions whatsoever. Advantageously, however, the (co)polymerization is conducted so as to result in a molecular weight distribution Mw/Mn, measured by gel permeation chromatography using polystyrene as standard, of $\leqq 12$, with particular preference $\leqq 10$, and in particular $\leqq 7$.

Suitable reactors for the (co)polymerization processes are the customary and known stirred vessels, cascade stirred vessels, tube reactors, loop reactors or Taylor reactors, as described, for example, in the patents DE 1 071 241 B1, EP 0 498 583 A1 or DE 198 28 742 A1 or in the article by K. Kataoka in Chemical Engineering Science, Volume 50, No. 9, 1995, pages 1409 to 1416. The free-radical (co)polymerization is preferably conducted in stirred vessels or Taylor reactors, the Taylor reactors being configured such that the conditions of Taylor flow are met over the entire length of the reactor, even if the kinematic viscosity of the reaction medium alters greatly—in particular, increases—as a result of the (co)polymerization.

The (co)polymerization is advantageously conducted at temperatures above room temperature, preference being given to the choice of a temperature range of from 30 to 95° C., with very particular preference from 50 to 90° C.

When using particularly volatile monomers (A) the (co)polymerization may also be conducted under pressure, preferably under from 1.5 to 3000 bar, with particular preference from 5 to 1500 and, in particular, from 10 to 1000 bar. In specific cases, temperatures higher than 95° C. may be used in this case. Use may be made in this context of the regimes described in German Patent Application DE-A-196 28 142, page 4, lines 6 to 36.

The process of the invention may be performed so as to give the bimodal particle size distribution described above. Methods of producing bimodal particle size distributions are customary and known in the technological field in question here. It is preferred to use the seed method described in German Patent Application DE-A-196 28 142, page 5, lines 31 to 49.

The primary dispersions of the invention are suitable as adhesives, sealing compounds and coating compositions, or for preparing them. In particular, they are suitable for preparing coating materials.

An essential advantage of the primary dispersions of the invention is that they can be used per se as adhesives, sealing compounds and coating materials of the invention, preferably as coating materials, more preferably as surfaces, solid-color topcoats, aqueous basecoats and clearcoats, and in particular as clearcoats. For these end uses, at least one conventional and known additive in effective amounts may be added to the primary dispersions of the invention before, during and/or after their preparation. Before or during the preparation of the primary dispersions of the invention, the only additives added are those which do not disrupt, or even totally inhibit, the miniemulsion polymerization. The general technical knowledge of the skilled worker allows him or her to identify such additives. Preferably, the said additives are added after the preparation of the primary dispersions of the invention.

Examples of suitable additives are pigments, as described in Römpp Lexikon Lacke und Druckfarben, Georg Thieme Verlag, 1998, pages 176, "Effect pigments"; pages 380 and 381 "Metal oxide-mica pigments" to "Metal pigments"; pages 180 and 181, "Iron blue pigments" to "Black iron oxide"; pages 451 to 453, "Pigments" to "Pigment volume concentration"; page 563, "Thioindigo pigments"; and page 567, "Titanium dioxide pigments". Pigments are used when the coating materials of the invention are used as surfacers, solid-color topcoats or aqueous basecoats, but in particular as aqueous basecoats in the context of the so-called wet-on-wet technique (cf., for example, European Patent 0 089 497 B1), to produce multicoat color and/or effect finishes.

Further examples of suitable additives which can be used both in the pigmented coating materials and in the unpigmented coating materials are additional binders such as oligomeric and polymeric, thermally curable, linear and/or branched poly(meth)acrylates or acrylate copolymers of block, comb and/or random structure, especially those described in the patent DE 197 36 535 A1, polyesters, especially those described in the patents DE 40 09 858 A1 or DE 44 37 535 A1, alkyds, acrylated polyesters, polylactones, polycarbonates, polyethers, epoxy resin-amine adducts, (meth)acrylate diols, partially hydrolyzed polyvinyl esters, polyurethanes and acrylated polyurethanes, as described in the patents EP 0 521 928 A1, EP 0 522 420 A1, EP 0 522 419 A1, EP 0 730 613 A1 or DE 44 37 535 A1, or polyureas.

Further examples of suitable additives are customary and known paint additives such as organic and inorganic fillers, thermally curable reactive diluents, low-boiling and/or high-boiling organic solvents ("long solvents"), UV absorbers, light stabilizers, free-radical scavengers, thermally labile free-radical initiators, crosslinking catalysts, devolatilizers, slip additives, polymerization inhibitors, defoamers, emulsifiers, wetting agents, adhesion promoters, leveling agents, film-forming auxiliaries, rheology control additives, or flame retardants. Further examples of suitable paint additives are described in the textbook "Lackadditive" by Johan Bieleman, Wiley-VCH, Weinheim, N.Y., 1998.

If the coating materials, adhesives and sealing compounds of the invention are to be curable with actinic radiation as well (dual cure), they comprise additives curable with actinic radiation. Said actinic radiation may comprise electromagnetic radiation such as near infrared (NIR), visible light, UV light or X-rays, or corpuscular radiation such as electron beams. Examples of suitable additives curable with actinic radiation are known from German Patent DE 197 09 467 C1.

In terms of method, the application of the coating materials, adhesives and sealing compounds of the invention has no special features, but instead can be carried out by all customary application methods, such as spraying, knife coating, brushing, flow coating, dipping, trickle coating or roller coating, for example. In the case of the coating materials of the invention it is preferred to use spray application methods, such as for example compressed air spraying, airless spraying, high-speed rotation, electrostatic spray application (ESTA), alone or in conjunction with hot spray application such as hot air spraying, for example.

Suitable coating substrates are all surfaces which are not damaged by curing of the coating materials, adhesives and sealing compounds present on them with application of heat and, if appropriate, of actinic radiation; examples include metals, plastics, wood, ceramic, stone, textile, fiber composites, leather, glass, glass fibers, glasswool and rockwool, mineral-bound and resin-bound building materials, such as plasterboards and cement boards or roof tiles, and also assemblies of these materials.

Accordingly, the coating materials of the invention in particular are highly suitable for applications in automotive finishing, especially OEM automotive finishing, in the coating of furniture, doors or windows, in the coating of interior and exterior architectural structures, or in industrial coating, including coil coating, container coating and the impregnation or coating of electrical components. In the context of industrial coatings, they are suitable for coating virtually all parts for private or industrial use, such as radiators, domestic appliances, small metal parts such as nuts and bolts, wheel caps, rings, packaging, or electrical components such as motor windings or transformer windings.

The adhesives and sealing compounds of the invention may also be used with advantage in the industrial applications described above.

In the case of electrically conductive substrates it is possible to use primers produced in a customary and known manner from electrodeposition (ED) coating materials. Suitable for this purpose are both anodic (AED) and cathodic (CED) electrodeposition coating materials, but especially CED. Unfunctionalized and/or apolar plastic surfaces can be subjected to conventional treatment before coating, such as with a plasma or by flaming, or may be provided with an aqueous primer.

The method of curing the applied coating materials, adhesives and sealing compounds of the invention also has no special features, but instead takes place in accordance with the customary and known thermal methods such as heating in a circulating air oven or irradiation with IR lamps, which in the case of dual cure may be supplemented by exposure to actinic radiation. In this context it is possible to use radiation sources such as high-pressure or low-pressure mercury vapor lamps, which may be doped with lead in order to open up a radiation window up to 405 nm, or electron beam sources.

The resultant coatings of the invention, especially the single-coat or multicoat color and/or effect, or transparent, finishes of the invention, are easy to produce and have outstanding optical properties and very high chemical resistance and weathering stability. Accordingly, the substrates of the invention, comprising at least one coating of the invention, are of particularly high service value and have a particularly long service life, which makes them particularly attractive, economically and technically, for producers and users.

In addition, the adhesive films and seals of the invention, produced from the adhesives and sealing compounds of the invention, possess outstanding performance properties, such as a high level of adhesion and complete sealing under extreme climatic conditions, including severe fluctuations in temperature and humidity, with the consequence that the substrates bonded and/or sealed therewith are likewise of special economic and technical value.

This applies even more to substrates coated, bonded and sealed with the coatings, adhesive films and seals of the invention.

EXAMPLES 1 TO 3

The Preparation of Primary Dispersions of the Invention and Production of Coatings of the Invention by the Process of the Invention For carrying out Examples 1 to 3, a mixture of monomers (A) was dispersed in an aqueous dispersion of a blocked polyisocyanate in each case. The resulting preemulsions were converted to finely divided miniemulsions in an Ultra-Turrax at 10,000 rpm for 30 s. In the case of Example 2, a nozzle jet disperser was used additionally. Surprisingly it was found that this additional dispersing step could be omitted, since homogenization in the Ultra-Turrax already gave the desired miniemulsions.

Table 1 gives an overview of the starting materials used in the miniemulsions, of the amounts in which they were used, and of the z-average particle diameter of the monomer droplets, which was determined by means of photon correlation spectroscopy in accordance with the principle of dynamic, quasielastic light scattering, using a PCS Malvern Zetasizer 1000.

The miniemulsions were transferred to a suitable steel reactor and heated slowly to 70 or 80° C. with stirring. At this temperature the miniemulsions were stirred until the solids content of the resultant primary dispersions of the invention showed no further increase. The primary dispersions of the invention were virtually or completely free from coagulum and were stable to sedimentation over several weeks.

Table 1 gives an overview of the polymerization time, the theoretical glass transition temperature Tg, calculated by the method of Fox, of the (co)polymers present in the primary dispersions of the invention, their hydroxyl number, and also the z-average particle diameter (measured using a PCS Malvern Zetasizer 1000), the solids content, the sieve residue, and the sediment of the primary dispersions of the invention.

The primary dispersions of the invention were adjusted to an efflux time from the DIN 4 flow cup of 24 s, using the commercial thickener Collacral® VL from BASF Aktiengesellschaft, then knife coated onto glass plates, in a wet film thickness of 150 μm, and baked for 30 minutes at 145° C., 160° C. and 180° C. The results set out in Table 1 for the methyl ethyl ketone test demonstrate that the resultant hard and transparent coatings of the invention had a particularly high solvent stability.

TABLE 1

Material composition and properties of the miniemulsions of the invention, polymerization conditions, material composition and properties of the primary dispersions of the invention, and solvent stability of the coatings of the invention

| Example | 1 | 2 | 3 |
|---|---|---|---|
| Miniemulsion: Composition (parts by weight: | | | |
| Methyl methacrylate | 26 | 26 | 26 |
| n-Butyl methacrylate | 31 | 31 | 31 |
| Styrene | 13 | 13 | 13 |
| Hydroxypropyl methacrylate | 28 | 28 | 28 |
| Diphenylethylene | 2 | 2 | 2 |
| Dispersion of the blocked polyisocyanate[a)] | 368.3 | 368.3 | 368.3 |
| Additional blocked polyisocyanate[b)] | 5 | — | — |
| OH:NCO ratio | 1:1 | 1:1 | 1:1 |
| Particle diameter (nm) | 149/147 | 134/137 | 137/138 |
| Polymerization: | | | |
| Initiator[c)] (parts by weight per 100 parts by weight of monomer mixture and blocked polyisocyanate) | 5 | 5 | 5 |
| Polymerization time | 7 h 40 mn | 6 h 50 mn | 6 h 20 mn |
| Primary dispersion: | | | |
| Solids content[d)] (% by wt.) | 35.9 | 37.8 | 37.6 |
| Particle diameter (nm) | 148/144 | 143/144 | 147/140 |
| Sieve residue wet/dry (g) | 1.5 | 3 | 3 |
| Sediment, wet (%) | <0.1 | 0.75 | 0.75 |
| Copolymer: | | | |
| Glass transition temperature (theoretical, acc. Fox) (° C.) | 29.17 | 29.17 | 29.17 |
| Hydroxyl number (mg KOH/g) | 109 | 109 | 109 |
| Clearcoat: | | | |
| MEK DS[e)] | >200 | >200 | >200 |

[a)]Trixene ® BI 7986 from Baxenden; aqueous dispersion of the isocyanurate of hexamethylene diisocyanate, blocked with 3,5-dimethylpyrazole, solids content 40% by weight, N-methylpyrrolidone content: 6.5% by weight, NCO content (blocked): 5% by weight;
[b)]dimethylpyrazole-blocked commercial polyisocyanate based on isophorone diisocyanate, N-methyl-pyrrolidone content of the dispersion: 6.5% by weight, NCO content (blocked) of the dispersion: 15.5% by weight;
[c)]tert-butyl peroxyethylhexanoate;
[d)]130° C., one hour;
[e)]number of double strokes with a cotton pad soaked with methyl ethyl ketone.

What is claimed is:

1. An aqueous composition comprising a polymer having a diameter of <500 mn comprising a free-radical microemulsion or miniemulsion polymerization product of at least one olefinically unsaturated monomer (A) in the presence of at least one hydrophobic crosslinking agent for the (co)polymer resulting from the at least one olefinically unsaturated monomer (A) is dispersed prior to (co)polymerization in an aqueous dipersion of the crosslinking agent; wherein the aqueous composition is one of a primary dispersion and a coating material, and wherein the polymer comprises a disposed solid core-shell particle, wherein the monomer (A) comprises at least one diarylethylene of the general formula I $$R^1R^2C=CR^3R^4 \quad (I)$$

wherein $R^1$, $R^2$, $R^3$, and $R^4$ are each independently one of a hydrogen atom, an unsubstituted alkyl radical, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl radical, an unsubstituted arylalkyl radical, an unsubstituted arylcycloalkyl radical, a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl radical, a substituted arylalkyl radical, and a substituted arylcycloalkyl radical, with the proviso that at least two of $R^1$, $R^2$, $R^3$, and $R^4$ are at least one of an unsubstituted aryl radical, an unsubstituted arylalkyl radical, an unsubstituted arylcycloalkyl radical, a substituted aryl radical, a substituted arylalkyl radical, and a substituted arylcycloalkyl radical.

2. The aqueous composition of claim 1, wherein the aryl radical is one of a phenyl radical or a naphthyl radical.

3. The aqueous composition of claim 1, wherein the substituent in at least one of $R^1$, $R^2$, $R^3$, and $R^4$ is one of an electron-withdrawing atom, an electron-donating atom, and an organic radical.

4. The aqueous composition of claim 1, wherein the substituent is at least one of a halogen atom, a nitrile, a nitro group, an at least partially halogenated alkyl radical, an at least partially halogenated cycloalkyl radical, an at least partially halogenated alkylcycloalkyl radical, an at least partially halogenated cycloalkylalkyl radical, an at least partially halogenated aryl radical, an at least partially halogenated alkylaryl radical, an at least partially halogenated cycloalkylaryl radical, an at least partially halogenated arylalkyl radical, and an at least partially halogenated arylcycloalkyl radical, an aryloxy radical, a alkyloxy radical, and a cycloalkyloxy radical, an arylthio radical, a alkylthio radical, a cycloalkylthio radical, a primary amino group, a secondary amino group, and a tertiary amino group.

5. The aqueous composition of claim 1, wherein the crosslinking agent is at least one of a blocked polyisocyanate, a tris(alkoxycarbonylamino)triazine, and a fully etherified amino resin.

6. The aqueous composition of claim 1, wherein the crosslinker comprises a 3,5-dimethylpyrazole-blocked polyisocyanate.

7. A process for preparing the aqueous the aqueous compositon of claim 1, comprising
I. dispersing the at least one olefinically unsaturated monomer (A) in the at least one hydrophobic crosslinking agent; and
II. free-radical microemulsion or miniemulsion (co)polymerizing the at least one olefinically unsaturated monomer (A) in the presence of the at least one hydrophobic crosslinking agent, wherein the monomer (A) comprises at least one diarylethylene of the general formula I $$R^1R^2C=CR^3R^4 \quad (I)$$

wherein $R^1$, $R^2$, $R^3$, and $R^4$ are each independently one of a hydrogen atom, an unsubstituted alkyl radical, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl radical, an unsubstituted arylalkyl radical, an unsubstituted arylcycloalkyl radical, a substituted alkyl radical, a substituted cycloalkyl radical, a substituted alkylcycloalkyl radical, a substituted cycloalky-lalkyl radical, a substituted aryl radical, a substituted alkylaryl radical, a substituted cycloalkylaryl radical, a substituted arylalkyl radical, and a substituted arylcycloalkyl radical, with the proviso that at least two of $R^1$, $R^2$, $R^3$, and $R^4$ are at least one of an unsubstituted aryl radical, an unsubstituted arylalkyl radical, an unsubstituted arylcycloalkyl radical, a substituted aryl radical, a substituted arylalkyl radical, and a substituted arylcycloalkyl radical.

8. The process of claim 7, wherein the aryl radical is one of a phenyl radical or a naphthyl radical.

9. The process of claim 7, wherein the substituent in at least one of $R^1$, $R^2$, $R^3$, and $R^4$ is one of an electron-withdrawing atom, an electron-donating atom, and an organic radical.

10. The process of claim 7, wherein the substituent is at least one of a halogen atom, a nitrile, a nitro group, an at least partially halogenated alkyl radical, an at least partially halogenated cycloalkyl radical, an a least partially halogenated alkylcycloalkyl radical, an at least partially halogenated cycloalkylalkyl radical, an at least partially halogenated aryl radical, an at least partially halogenated alkylaryl radical, an at least partially halogenated cycloalkylaryl radical, an at least partially halogenated arylalkyl radical, and an at least partially halogenated arylcycloalkyl radical, an aryloxy radical, a alkyloxy radical, and a cycloalkyloxy radical, an arylthio radical, a alkylthio radical, a cycloalkylthio radical, a primary amino group, a secondary amino group, and a tertiary amino group.

11. The process of claim 7, wherein the crosslinking agent is at least one of a blocked polyisocyanate, a tris(alkoxycarbonylamino)triazine, and a fully etherified amino resin.

12. The process of claim 11, wherein the blocked polyisocyanate is a 3,5-dimethylpyrazole-blocked polyisocyanate.

* * * * *